(12) United States Patent
Lundberg et al.

(10) Patent No.: US 7,853,572 B2
(45) Date of Patent: Dec. 14, 2010

(54) BULK DOWNLOAD OF DOCUMENTS FROM A SYSTEM FOR MANAGING DOCUMENTS

(75) Inventors: Steven W. Lundberg, Edina, MN (US); Janal M. Kalis, Minneapolis, MN (US); Shal Jain, New Brighton, MN (US); Pradeep Sinha, Medina, MN (US); Thomas F. Brennan, Plymouth, MN (US)

(73) Assignee: FoundationIP, LLC, Minneapolis, MN (US)

( * ) Notice: Subject to any disclaimer, the term of this patent is extended or adjusted under 35 U.S.C. 154(b) by 766 days.

(21) Appl. No.: 11/085,840

(22) Filed: Mar. 21, 2005

(65) Prior Publication Data

US 2006/0212419 A1   Sep. 21, 2006

(51) Int. Cl.
*G06F 17/30* (2006.01)
*G06F 7/00* (2006.01)

(52) U.S. Cl. .................. 707/687; 707/758; 707/795; 707/929

(58) Field of Classification Search ............... None
See application file for complete search history.

(56) References Cited

U.S. PATENT DOCUMENTS

| | | | | |
|---|---|---|---|---|
| 5,329,447 A * | 7/1994 | Leedom, Jr. | .................. | 705/9 |
| 5,423,043 A | 6/1995 | Fitzpatrick et al. | .......... | 719/317 |
| 5,895,468 A * | 4/1999 | Whitmyer, Jr. | ............... | 707/10 |
| 5,987,464 A | 11/1999 | Schneider | .................... | 707/10 |
| 6,161,149 A | 12/2000 | Achacoso et al. | ............. | 710/4 |
| 6,182,078 B1 * | 1/2001 | Whitmyer, Jr. | ............... | 707/10 |
| 6,237,040 B1 | 5/2001 | Tada | ......................... | 709/246 |
| 6,250,930 B1 | 6/2001 | Mintz | ......................... | 434/323 |
| 6,339,767 B1 | 1/2002 | Rivette et al. | .................. | 707/2 |
| 6,369,840 B1 | 4/2002 | Barnett et al. | .............. | 715/853 |
| 6,499,021 B1 | 12/2002 | Abu-Hakima | ................. | 706/10 |
| 6,549,612 B2 | 4/2003 | Gifford et al. | ............. | 379/67.1 |
| 6,549,894 B1 * | 4/2003 | Simpson et al. | ................. | 707/1 |
| 6,556,992 B1 | 4/2003 | Barney et al. | ................... | 707/6 |
| 6,662,178 B2 | 12/2003 | Lee | ................................ | 707/3 |
| 6,694,315 B1 * | 2/2004 | Grow | ........................... | 707/10 |
| 6,721,747 B2 | 4/2004 | Lipkin | ......................... | 707/10 |
| 6,766,307 B1 | 7/2004 | Israel et al. | .................... | 705/80 |
| 6,839,707 B2 | 1/2005 | Lee et al. | ...................... | 707/8 |

(Continued)

OTHER PUBLICATIONS

Coolidge, D.S. "Resources for the IP-Savvy Attorney", Law Office Computing, Oct./Nov. 2002, downloaded from www.lawofficecomputing.com.*

(Continued)

*Primary Examiner*—Luke S Wassum
(74) *Attorney, Agent, or Firm*—Kendal M. Sheets

(57) ABSTRACT

A method and apparatus provide, in one example embodiment, for storing and processing information in a data storage and processing system on a server, the server accessed by attorneys using the system from client computers, wherein the information pertains to a plurality of legal matters being handled by the attorneys, and wherein the legal matters are for respective clients. A group of electronic documents stored in the management system are selected using the client computer, wherein the electronic documents are associated with a particular one of the legal matters, and the user requests that the group of documents be bulk downloaded. The group of documents is downloaded to a storage device on the client or other storage or computing device.

13 Claims, 13 Drawing Sheets

U.S. PATENT DOCUMENTS

| | | | |
|---|---|---|---|
| 6,859,806 B1* | 2/2005 | Kamarei et al. | 707/10 |
| 6,912,582 B2 | 6/2005 | Guo et al. | 709/229 |
| 6,970,842 B1* | 11/2005 | Ashby | 705/38 |
| 6,990,483 B2* | 1/2006 | Wagner | 707/3 |
| 7,007,068 B2 | 2/2006 | Morkel | 709/206 |
| 7,010,144 B1 | 3/2006 | Davis et al. | 382/100 |
| 7,016,851 B1* | 3/2006 | Lee | 705/1 |
| 7,069,278 B2* | 6/2006 | Telkowski et al. | 707/204 |
| 7,069,592 B2 | 6/2006 | Porcari | 726/26 |
| 7,076,439 B1 | 7/2006 | Jaggi | 705/9 |
| 7,085,755 B2 | 8/2006 | Bluhm et al. | 707/3 |
| 7,130,858 B2* | 10/2006 | Ciaramitaro et al. | 707/101 |
| 7,444,334 B1* | 10/2008 | Lemaire et al. | 707/10 |
| 7,532,340 B2* | 5/2009 | Koppich et al. | 358/1.15 |
| 7,711,738 B1* | 5/2010 | Kraft et al. | 707/752 |
| 2001/0001864 A1 | 5/2001 | Page et al. | 709/205 |
| 2001/0034669 A1 | 10/2001 | Tropper | 705/27 |
| 2001/0037460 A1 | 11/2001 | Porcari | 726/28 |
| 2002/0029215 A1* | 3/2002 | Whitmyer, Jr. | 707/10 |
| 2002/0032738 A1 | 3/2002 | Foulger et al. | 709/206 |
| 2002/0059076 A1 | 5/2002 | Grainger et al. | 705/1 |
| 2002/0072920 A1 | 6/2002 | Grainger | 705/1 |
| 2002/0083093 A1 | 6/2002 | Goodisman et al. | 715/255 |
| 2002/0111824 A1 | 8/2002 | Grainger | 705/1 |
| 2002/0111953 A1* | 8/2002 | Snyder | 707/101 |
| 2002/0138465 A1 | 9/2002 | Lee et al. | 707/1 |
| 2002/0161733 A1* | 10/2002 | Grainger | 706/45 |
| 2003/0144969 A1* | 7/2003 | Coyne | 705/400 |
| 2003/0144970 A1* | 7/2003 | Coyne | 705/400 |
| 2004/0006562 A1* | 1/2004 | Wagner | 707/5 |
| 2004/0044688 A1* | 3/2004 | Brudz et al. | 707/104.1 |
| 2004/0205537 A1 | 10/2004 | Graham et al. | 715/229 |
| 2004/0236703 A1* | 11/2004 | Lemaire et al. | 705/76 |
| 2004/0236753 A1* | 11/2004 | Porcari et al. | 707/10 |
| 2005/0060348 A1* | 3/2005 | Coyne et al. | 707/104.1 |
| 2005/0065987 A1* | 3/2005 | Telkowski et al. | 707/204 |
| 2005/0210008 A1* | 9/2005 | Tran et al. | 707/3 |
| 2005/0210009 A1* | 9/2005 | Tran | 707/3 |
| 2006/0173703 A1* | 8/2006 | Lee | 705/1 |
| 2006/0173705 A1* | 8/2006 | Lee | 705/1 |
| 2006/0200508 A1* | 9/2006 | Telkowski et al. | 707/204 |
| 2007/0185850 A1* | 8/2007 | Walters et al. | 707/3 |
| 2007/0208719 A1* | 9/2007 | Tran | 707/3 |
| 2007/0250371 A1* | 10/2007 | Benson | 705/9 |
| 2009/0307577 A1* | 12/2009 | Lee | 715/226 |

OTHER PUBLICATIONS

IPOrganisers "Intellectual Property Software Resources", undated, downloaded from www.ipmenu.com/ipsoftware.htm.*

Becker, R. and M. Gerstein "Practicing Cyberlaw in the Year 2000", New Jersey Lawyer, No. 179, Sep. 1996, pp. 12-15, 26-27.*

Rolla, M. and J.M. Duncan "IP Docketing Software Can Be Exciting, Really!", Legal Tech Newsletter, Brinks, Hofer, Gilson & Lione, Jun. 2003.*

Master Data Center, "IP Master", Product Brochure, Dec. 2003.*

Steinriede, K. "Wayne Company Downloads Dockets to Keep Customers Ahead", Philadelphia Inquirer, downloaded from www.marketspan.com, Apr. 10, 2000.*

Premier Technologies "Synchmaster Systems and Data Synchronization Software", product brochure, downloaded from www.premiertechnology.com, Dec. 17, 2003.*

Gould, Jr., L.F. and L. Bandrowsky "Solving an IP Practice Business Need with Patricia", LJN's Legal Tech Newsletter, vol. 26, No. 10, Jan. 2009.*

Schwegman, M. L., et al., "Using the Internet to Support Your Practice in Minnesota", *Lorman Education Services*, Eau Claire, WI, (Nov. 30, 2000), pp. 1, 5, 7, 9, 11, 13, 15, 17, 19, odd pages only 25-81; even pages only pp. 82-96; odd pages only pp. 97-161.

"U.S. Appl. No. 09/872,701 Non-Final Office Action Mailed Aug. 10, 2007", 12 pgs.

"U.S. Appl. No. 09/872,701 Advisory Action mailed Aug. 29, 2006", 3 pgs.

"U.S. Appl. No. 09/872,701 Final Office Action mailed Mar. 30, 2005", 9 pgs.

"U.S. Appl. No. 09/872,701 Final Office Action mailed Jun. 15, 2006", 11 pgs.

"U.S. Appl. No. 09/872,701 Final Office Action mailed Dec. 8, 2003", 6 pgs.

"U.S. Appl. No. 09/872,701 Non Final Office Action mailed Aug. 5, 2003", 8 pgs.

"U.S. Appl. No. 09/872,701 Non Final Office Action mailed Aug. 10, 2007", 13 pgs.

"U.S. Appl. No. 09/872,701 Non Final Office Action mailed Oct. 25, 2005", 9 pgs.

"U.S. Appl. No. 09/872,701 Non-Final Office Action mailed Jun. 28, 2004", 8 pgs.

"U.S. Appl. No. 09/872,701 Response filed Feb. 9, 2004 to Final Office Action mailed Dec. 8, 2003", 15 pgs.

"U.S. Appl. No. 09/872,701 Response filed Mar. 27, 2006 to Non Final Office Action Oct. 25, 2005", 16 pgs.

"U.S. Appl. No. 09/872,701 Response filed Aug. 15, 2006 to Final Office Action mailed Jun. 15, 2006", 17 pgs.

"U.S. Appl. No. 09/872,701 Response filed Aug. 30, 2005 to Final Office Action mailed Mar. 30, 2005", 16 pgs.

"U.S. Appl. No. 09/872,701 Response filed Sep. 28, 2004 to Non Final Office Action Jun. 28, 2004", 16 pgs.

"U.S. Appl. No. 09/872,701 Response filed Nov. 5, 2003 to Non Final Office Action mailed Aug. 5, 2003", 17 pgs.

"U.S. Appl. No. 09/872,701 Response to Non-Final Office Action filed Nov. 16, 2007", 8 pgs.

"U.S. Appl. No. 09/872,701 Non-Final Office Action mailed Mar. 14, 2008", OARN,16 Pgs.

"U.S. Appl. No. 10/128,141 Appeal Brief filed Feb. 21, 2007", 23 pgs.

"U.S. Appl. No. 10/128,141 Decision from Pre-Appeal Brief Review mailed Dec. 21, 2006", 2 pgs.

"U.S. Appl. No. 10/128,141 Final Office Action mailed Aug. 23, 2006", 14 pgs.

"U.S. Appl. No. 10/128,141 Final Office Action mailed Dec. 22, 2005", 13 pgs.

"U.S. Appl. No. 10/128,141 Non Final Office Action mailed Mar. 8, 2006", 19 pgs.

"U.S. Appl. No. 10/128,141 Non Final Office Action mailed Jul. 14, 2005", 17 pgs.

"U.S. Appl. No. 10/128,141 Pre-Appeal Brief Request for Review filed Oct. 23, 2006", 4 pgs.

"U.S. Appl. No. 10/128,141 Response to Final Office Action filed Feb. 22, 2006", 9 pgs.

"U.S. Appl. No. 10/128,141 Response to Non Final Office Action filed Jun. 8, 2006", 11 pgs.

"U.S. Appl. No. 10/128,141 Response to Non Final Office Action filed Oct. 14, 2005", 12 pgs.

"U.S. Appl. No. 10/741,166 Final Office Action mailed Mar. 22, 2006", 9 pgs.

"U.S. Appl. No. 10/741,166 Non Final Office Action mailed Jun. 7, 2006", 11 pgs.

"U.S. Appl. No. 10/741,166 Non Final Office Action mailed Oct. 7, 2005", 6 pgs.

"U.S. Appl. No. 10/741,166 Response filed Jan. 9, 2006 to Non Final Office Action mailed Oct. 7, 2005", 5 pgs.

"U.S. Appl. No. 10/741,166 Response filed May 22, 2006 to Final Office Action Mar. 22, 2006", 27 pgs.

"U.S. Appl. No. 10/741,166 Response filed Sep. 7, 2006 to Non Final Office Action mailed Jun. 7, 2006", 32 pgs.

* cited by examiner

HOMEPAGE

PORTFOLIO IP

QUICK TOUR

NEW USER —REGISTER— ~103

USERNAME:
[ ] ~101

PASSWORD:
[ ] ~102

[LOGIN]

 FORGOT PASSWORD (R)EGISTER  (L)OGIN  (H)ELP

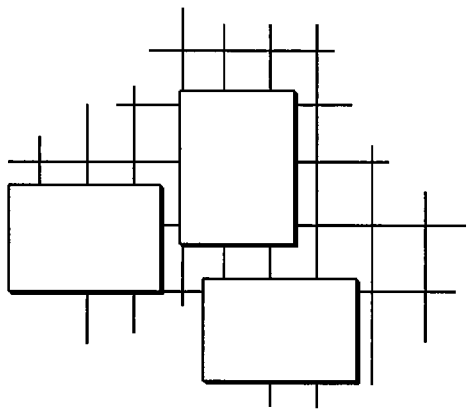

AN IP ENTERPRISE
MANAGEMENT SYSTEM

"HE THAT WILL NOT APPLY NEW REMEDIES MUST EXPECT
NEW EVILS, FOR TIME IS THE GREATEST INNOVATOR."

-- FRANCIS BACON --

NEWS  ABOUT US  NEWS
SECURITY
PRIVACY STATEMENT
TERMS & CONDITIONS
CONTACT US

COPYRIGHT 2000, PORTFOLIO IP. ALL RIGHTS RESERVED.

*FIG. 1*

WELCOME JANAL KALIS. YOU LAST LOGGED IN AT 10:16AM ON MARCH 29, 2001

NEW MESSAGES
NEW TASKS
NEW MATTERS

SHOWING MOST RECENT POSTINGS ...

| @ | TYPE | FLAG | MATTER TITLE | FROM | DATE/TIME RECEIVED |
|---|---|---|---|---|---|
| 0 | | E-MAIL DRAGGING | IT-THE REAL DEAL | SPARKY KALIS | 3/9/01 10:45 AM |
| 1 | | NOTICE ON MISSING PARTS | IT-THE REAL DEAL | SPARKY KALIS | 3/8/01 9:10 AM |
| 1 | | OFFICE ACTION RECEIVED | SPATIAL SOUND STEERING SYSTEM | JANAL KALIS | 3/8/01 7:42 AM |
| 1 | | ISSUE NOTIFICATION | SPATIAL SOUND STEERING SYSTEM | JANAL KALIS | 3/8/01 7:40 AM |
| 1 | | AMENDMENT/ RESPONSE | SPATIAL SOUND STEERING SYSTEM | JANAL KALIS | 3/8/01 7:38 AM |

WELCOME JANAL KALIS. YOU LAST LOGGED IN AT 10:16AM ON MARCH 29, 2001

| NEW MESSAGES |
| NEW TASKS |
| NEW MATTERS |

SHOWING FLAGGED/UNVISITED TASKS ...

| FLAG | TASK | TYPE | MATTER TITLE | STATUS | DATE |
|---|---|---|---|---|---|
| | PROOF PATENT FOR ERRORS | | CHEMICAL MECHANICAL POLISHING SLURRY | DONE | |
| | OPEN THE MATTER | | INTERACTIVE VIDEO COMMUNICATION IN REAL TIME | DONE | |
| | US-MISSING PARTS ACTION | PTO DUE DATE | TH-2 SPECIFIC GENE | NOT STARTED | |
| | DOCKET MISSING PARTS | | IT-THE REAL DEAL | IN PROCESS | DATE DUE : 03/06/2001 |
| | PREPARE DECLARATION POA | | IT-THE REAL DEAL | COMPLETED | DATE COMPLETED : 03/06/2001 |
| | DOCKET ENST. OFFICE ACTION | | IT-THE REAL DEAL | COMPLETED | |
| | PREPARE DRAFT OF AMENDMENT/RESPONSE | PTO | IT-THE REAL DEAL | IN PROCESS | |
| | OPENED PATENT FILE | OTHER | INTERACTIVE VIDEO COMMUNICATION IN REAL TIME | COMPLETED | |
| | RECEIVED DISCLOSURE | OTHER | INTERACTIVE VIDEO COMMUNICATION IN REAL TIME | IN PROCESS | |
| | TEXT FORMAL DRAWINGS | OTHER | INTERACTIVE VIDEO COMMUNICATION IN REAL TIME | IN PROCESS | DATE COMPLETED : 05/06/1999 |
| | DOCKETING FOR FIRST OFFICE ACTION | OTHER | INTERACTIVE VIDEO COMMUNICATION IN REAL TIME | IN PROCESS | |
| | DOCKETING FOR FINAL OFFICE ACTION | OTHER | INTERACTIVE VIDEO COMMUNICATION IN REAL TIME | IN PROCESS | DATE COMPLETED : 03/05/2001 |
| | DOCKET NOTICE OF ALLOWANCE | OTHER | INTERACTIVE VIDEO COMMUNICATION IN REAL TIME | IN PROCESS | |
| | COMPLETE FILING CHECKLIST | OTHER | INTERACTIVE VIDEO COMMUNICATION IN REAL TIME | IN PROCESS | DATE COMPLETED : 05/06/1999 |
| | THREE MONTH DOCKET DATE | USPTO | ANAEROBIC LIFE SUPPORT SYSTEM | | DATE DUE : 12/31/1969 |
| | 3 MONTH TASK | PTO | ANAEROBIC LIFE SUPPORT SYSTEM | | |
| | FIVE MONTH DATE | USPTO | ANAEROBIC LIFE SUPPORT SYSTEM | | DATE DUE : 12/31/1969 |
| | SIX MONTH DOCKET DATE | USPTO | ANAEROBIC LIFE SUPPORT SYSTEM | | DATE DUE : 12/31/1969 |
| | 3 MONTH DUE DATE | USPTO | ANAEROBIC LIFE SUPPORT SYSTEM | | |
| | 3 MONTH DUE DATE | PTO | IT-THE REAL DEAL | | DATE DUE : 09/15/2001 |
| | 6-MO. FINAL DEADLINE | PTO | IT-THE REAL DEAL | | DATE DUE : 09/15/2001 |

WELCOME JANAL KALIS. YOU LAST LOGGED IN AT 10:16AM ON MARCH 29, 2001

NEW MESSAGES
NEW TASKS
NEW MATTERS

SHOWING THE NEW MATTERS ...

| TITLE | TYPE | STATUS |
|---|---|---|
| METHOD AND APPARATUS FOR STORING GUIDE WIRES | PATENT APPLICATION | OPEN |
| METHOD AND DEVICE FOR DEFLECTING A PROBE | PATENT APPLICATION | OPEN |
| METHOD AND DEVICE FOR DEFLECTING A PROBE | PCT APPLICATION | OPEN |

[FIRST] [PREV]   SHOWING 1 - 8 OF 8 [NEXT] [LAST]

| ORGANIZATION NAME | TYPE | ADMINISTRATIVE CONTACT | PHONE | E-MAIL |
|---|---|---|---|---|
| ZIBEX CORP | CORP | STEVEN RUSSEL | | SRUSSELL@ZIBEX.COM |
| SOAR | LAW | JANAL KALIS | | ANS@SOAR.COM |
| SCHWEGMAN LUNDBERG WOESSNER & KLUTH | LAW | JANAL M. KALIS | 612-373-6900 | KALIS@SLWK.COM |
| MILLENNIUM PHARMACEUTICALS | CORP | SCOT A. BRED | 516-561-6563 | SCBRETT@MMP.COM |
| INTEL CORP | CORP | TOM REYNOLDS | 408-653-9703 | TREYNOLDS@INTEL.COM |
| GENERAL ELECTRIC | CORP | SPAM KALIS | | ARS@SLWK.COM |
| CHARLES TRUWIT | OTHER | CHARLES TRUWIT | | JKALIS@SLWK.COM |
| CEREAL INGREDIENTS INC. | CORP | CRAIG LERVEL | | CLERVEL@OPPENNEME.COM |

[FIRST] [PREV]   SHOWING 0 - 3 OF 3 [NEXT] [LAST]

| NAME | ORGANIZATION | USER ID | LAST MODIFICATION | |
|---|---|---|---|---|
| DOCKETING | GENERAL ELECTRIC | J.KALIS | 3/20/01 11:26PM | EDIT   DELETE |
| FIRST OFFICE ACTION DOCKETING | SOAR | J.KALIS | 3/22/01 10:26PM | EDIT   DELETE |
| FIRST OFFICE ACTION | SCHWEGMAN LUNDBERG WOESSNER & KLUTH | J.KALIS | 3/26/01 10:37PM | EDIT   DELETE |

601 [FIRST] [PREV]   SHOWING 0 - 3 OF 3 [NEXT] [LAST] 603      604      605   606
                602

FIG. 6

LAST MODIFIED BY : J.KALIS 3/22/01 10:28 AM

DETAILS
  [ACTIVITIES]

SHOWING 1 - 4 OF 4                                         ADD

| ACTIVITY NAME | |
|---|---|
| THREE MONTH DOCKET DATE | EDIT   DELETE |
| FOUR MONTH DOCKET DATE | EDIT   DELETE |
| FIVE MONTH DATE | EDIT   DELETE |
| SIX MONTH DOCKET DATE | EDIT   DELETE |

701 points to THREE MONTH DOCKET DATE

FIG. 7

ENTER TO VIEW ALL (OR) TYPE IN LETTERS FOR SELECT CRITERIA

[    ] SEARCH    ADDRESS

ALL A B C D E F G H I J K L M N O P Q R S T U V W X Y Z

[FIRST] [PREV]   SHOWING 1 - 10 OF 53 [NEXT] [LAST]

| | USER NAME | ENTITY NAME | PHONE | E-MAIL | | |
|---|---|---|---|---|---|---|
| ○ | SLWK | SCHEWGMAN LUNDBERG WOESSNER & KLUTH | | KALIS@SLWK.COM | PRIVATE | DELETE |
| ○ | PORTFOLIO | PORTFOLIO LLC | | KALIS@SLWK.COM | PRIVATE | DELETE |
| ○ | INTEL | INTEL | | | PRIVATE | DELETE |
| ⏀ | SOAR | JANAL K. KALIS | 612-316-9783 | ANS@SOAR.COM | PRIVATE | DELETE |
| ⏀ | GAY | GAY OEHLKE | | GOEHLKE@SLWK.COM | PRIVATE | DELETE |
| ⏀ | SANDY | SANDRA AMBERSON | | SAMBERSAN@SLWK.COM | PRIVATE | DELETE |
| ⏀ | JONATHAN | JONATHAN FERGUSON | | JFERGUSION@SLWK.COM | PRIVATE | DELETE |
| ⏀ | LYNDA | LYNDA WICKTER | | LCWE@SLWK.COM | PRIVATE | DELETE |
| ⏀⏀ | PORTFOLIO DOCKETING | PORTFOLIO DOCKETING | | | PRIVATE | DELETE |
| ○ | INTEL.COM | INTEL.COM | 406-653-9783 | EMOLDS@INTEL.COM | PRIVATE | DELETE |

802  801           803            804   ⏀⏀ GROUP  ○ ORGANIZATION  ⏀ INDIVIDUAL
                                              805              807        806

*FIG. 8*

POSTING TYPE: ☐ 📄 NOTES  ☐ ✉ MESSAGES  ☐ 📑 DOCUMENTS  (REFRESH)  (THREADED VIEW OFF)

[FIRST] [PREV] SHOWING 1 - 10 OF 32 [NEXT] [LAST]

| @ | TYPE | FLAG | SUBJECT | MATTER TITLE | FROM | DATE RECD. | |
|---|---|---|---|---|---|---|---|
| 1 | ✉ | | AMENDMENT AND RESPONSE | INTERACTIVE VIDEO IN REAL TIME-DEMO | JANAL KALIS | 3/29/01 7:07 AM | DELETE |
| 0 | ✉ | | FIRST OFFICE ACTION | INTERACTIVE VIDEO IN REAL TIME-DEMO | JANAL KALIS | 3/29/01 7:05 AM | DELETE |
| 1 | ✉ | | RECORDED ASSIGNMENT | INTERACTIVE VIDEO IN REAL TIME-DEMO | JANAL KALIS | 3/29/01 7:03 AM | DELETE |
| 0 | ✉ | | MISSING PARTS | INTERACTIVE VIDEO IN REAL TIME-DEMO | JANAL KALIS | 3/29/01 7:01 AM | DELETE |
| 1 | ✉ | | APPLICATION AS FILED | INTERACTIVE VIDEO IN REAL TIME-DEMO | JANAL KALIS | 3/29/01 6:51 AM | DELETE |
| 0 | ✉ | | CHECKLIST FOR FILING THE APPLICATION | INTERACTIVE VIDEO IN REAL TIME-DEMO | JANAL KALIS | 3/29/01 6:48 AM | DELETE |
| 1 | 📑 | | TESTDOC | METHOD AND DEVICE FOR DEFLECTING A PROBE | JANA OTTMAR | 3/28/01 3:55 PM | DELETE |
| 0 | ✉ | | INTERNAL DRAWINGS AS FILED | IMPLANTABLE RESERVOIR AND SYSTEM FOR DELIVERY OF A THERAPEUTIC AGENT | JANAL KALIS | 3/27/01 6:53 PM | DELETE |
| 1 | ✉ | | APPLICATION AS FILED | IMPLANTABLE RESERVOIR AND SYSTEM FOR DELIVERY OF A THERAPEUTIC AGENT | J. KALIS | 3/27/01 8:19 AM | DELETE |
| 0 | ✉ | | HELLO ALL | TEST 5 | J. KALIS | 3/22/01 11:05 PM | DELETE |

[FIRST] [PREV] SHOWING 1 - 10 OF 32 [NEXT] [LAST]  (THREADED VIEW OFF)

*FIG. 9*

TITLE: CHEMICAL MECHANICAL POLISHING SLURRY
TYPE: ISSUED PATENT          COUNTRY: UNITED STATES

| PATENT NO. | 5077.337 | ISSUE DATE | 7/20/2001 |
| --- | --- | --- | --- |
| SERIAL NO. | 0920317 | PUBLICATION DATE | |
| FIRST FILING DATE: | DEC 1, 1996 | LINEAGE | CICMA |

—1006

CREATED BY: JANAL KALIS, FEB 27, 2001

DETAILS
   ACTIVITIES
   ENTITIES
     PERSONNEL
     IDS DOCUMENTS

SHOW ALL [ ]

ADD <SELECT> ▽

| ACTIVITY | ACCESS | STATUS | DATE | |
| --- | --- | --- | --- | --- |
| HOME | PUBLIC | | | EDIT  DELETE |
| FIRST DRAFT APPLICATION | PUBLIC | DONE | DATE AWAITED: 07/31/1998 | EDIT  DELETE |
| FILED APPLICATION | PUBLIC | DONE | DATE COMPLETED: 12/01/1998 | EDIT  DELETE |
| ASSIGNMENT FILED | PUBLIC | DONE | DATE COMPLETED: 12/01/1998 | EDIT  DELETE |
| PRELIMINARY AMENDMENT FILED | PUBLIC | DONE | DATE COMPLETED: 12/01/1998 | EDIT  DELETE |
| NOTICE OF ALLOWANCE RESERVED | PUBLIC | DONE | DATE COMPLETED: 12/01/1998 | EDIT  DELETE |
| RECEIVE ISSUED PATENT | PUBLIC | DONE | DATE COMPLETED: 06/23/2000 | EDIT  DELETE |
| REVIEW CLAIMS | PUBLIC | | | EDIT  DELETE |

TITLE: CHEMICAL MECHANICAL POLISHING SLURRY
TYPE: ISSUED PATENT             COUNTRY: UNITED STATES

| PATENT NO. | 5077.337 | ISSUE DATE | 7/20/2001 |
| SERIAL NO. | 0920317 | PUBLICATION DATE | |
| FIRST FILING DATE: | DEC 1, 1996 | LINEAGE | CIGMA |

CREATED BY: JANAL KALIS, FEB 27, 2001

DETAILS
    ACTIVITIES
    ENTITIES
    PERSONNEL
    IDS DOCUMENTS
SHOW ALL ☐

ASSIGNMENT INFORMATION: ☐    ○ ORGANIZATION    ⚇ INDIVIDUAL  AFFILIATION

PARTIES IN INTEREST    ADD PARTY [<SELECT> ▽]

| | NAME | ROLE | MATTER# | BILLING# | CONTACT | X |
|---|---|---|---|---|---|---|
| 1101 ○ | INTEL CORP | ASSIGNEE | P6132 | P6132 | TOM REYNOLDS | DELETE |

LAW FIRMS    ADD LAW FIRM

| | NAME | MATTER# | BILLING# | CONTACT | X |
|---|---|---|---|---|---|
| 1102 ○ | SCHWEGMAN LUNDBERG WOESSNER & KLUTH | 884.015US1 | 884.015US1 | JANAL M.KALIS | DELETE |

*FIG. 11*

TITLE: CHEMICAL MECHANICAL POLISHING SLURRY
TYPE: ISSUED PATENT                    COUNTRY: UNITED STATES

| PATENT NO. | 5077.337 | ISSUE DATE | 7/20/2001 |
|---|---|---|---|
| SERIAL NO. | 0920317 | PUBLICATION DATE | |
| FIRST FILING DATE: | DEC 1, 1996 | LINEAGE | CIGMA |

CREATED BY: JANAL KALIS, FEB 27, 2001

DETAILS
  ACTIVITIES
  ENTITIES
  [PERSONNEL]
  IDS DOCUMENTS
                              SHOW ALL

INDIVIDUAL    GROUP    AFFILIATION

SHOWING 1-11 OF 11              ADD  < SELECT >

| | NAME | ROLE | COMPANY | EMAIL | STATUS | X |
|---|---|---|---|---|---|---|
| | JANAL M.KALIS | ADMIN | | KALIS@SLWK.COM | ACTIVE | DELETE |
| | KEIN LEE | INVENTOR | | KLEE@NE.COM | | DELETE |
| | THOMAS REYNOLDS | CORRESPONDENCE CONTACT | | KALIS@SLWK.COM | | DELETE |
| | GAY OEHIKE | MEMBER | | KALIS@SLWK.COM | ACTIVE | DELETE |
| | GAY OEHIKE | PARALEGAL | | KALIS@SLWK.COM | ACTIVE | DELETE |
| | SANDRA AMBERSON | MEMBER | | SAMBERSAN@SLWK.COM | ACTIVE | DELETE |
| | JONATHAN FERGUSON | LEGAL | | JFERGUSION@SLWK.COM | ACTIVE | DELETE |
| | JONATHAN FERGUSON | MEMBER | | JFERGUSION@SLWK.COM | | DELETE |
| | STEVEN W. LUNDBERG | BILLING ATTORNEY | | SLUNDBERG@SLWK.COM | ACTIVE | DELETE |
| | AROS CLARKSON | WORKING ATTORNEY | | AROSCKEN@SLWK.COM | ACTIVE | DELETE |
| | PORTFOLIO DOCKETING | | | | | |

TITLE: CHEMICAL MECHANICAL POLISHING SLURRY
TYPE: ISSUED PATENT                COUNTRY: UNITED STATES

| PATENT NO.        | 5077.337    | ISSUE DATE       | 7/20/2001 |
|-------------------|-------------|------------------|-----------|
| SERIAL NO.        | 0920317     | PUBLICATION DATE |           |
| FIRST FILING DATE:| DEC 1, 1996 | LINEAGE          | CIGMA     |

CREATED BY: JANAL KALIS, FEB 27, 2001

DETAILS
   ACTIVITIES
   ENTITIES
   PERSONNEL
   [IDS DOCUMENTS]

SHOW ALL

SHOW  <ALL>

PATENT DOCUMENTS                                           ADD NEW

| PATENT NUMBER | ISSUE DATE | COUNTRY | NAME | TRANSLATION | |
|---|---|---|---|---|---|
| NO PATENT DOCUMENTS ||||||

1301

PUBLICATIONS DOCUMENTS                                     ADD NEW

| AUTHOR/NUMBER | TITLE | CITATION | REF.PAGES | PUB. DATE | |
|---|---|---|---|---|---|
| NO PUBLICATIONS DOCUMENTS ||||||

BULK DOWNLOAD OF DOCUMENTS FROM A SYSTEM FOR MANAGING DOCUMENTS

CLAIM OF PRIORITY

This application claims priority from:

"INTERNET-BASED PATENT AND TRADEMARK APPLICATION MANAGEMENT SYSTEM", Steven W. Lundberg, Inventor, Ser. No. 09/872,701, filed Jun. 1, 2001, which claims priority to "INTERNET-BASED PATENT AND TRADEMARK APPLICATION MANAGEMENT SYSTEM", Ser. No. 60/280,386, filed Mar. 29, 2001;

"INTERNET-BASED PATENT AND TRADEMARK APPLICATION MANAGEMENT SYSTEM", Steven W. Lundberg, Inventor, Ser. No. 10/741,166, filed Dec. 17, 2003, which claims priority to "INTERNET-BASED PATENT AND TRADEMARK APPLICATION MANAGEMENT SYSTEM", Ser. No. 60/433,935, filed Dec. 17, 2002; and "METHODS, SYSTEMS AND EMAILS TO LINK EMAILS TO MATTERS AND ORGANIZATIONS", Sinha et al. inventors, Ser. No. 10/128,141, filed Apr. 23, 2002 which claims priority to "A SYSTEM FOR SENDING AND RECEIVING ELECTRONIC MESSAGES IN AN ENTERPRISE MANAGEMENT SYSTEM", Ser. No. 60/285,842, filed Apr. 23, 2001 and "SYSTEM, FUNCTIONAL DATA, AND METHODS FOR ON-LINE COLLABORATING USING MESSAGING, REPORTING, SECURITY, DOCKETING, BILLING, AND DOCUMENT MANAGEMENT", Ser. No. 60/335,732, filed May 10, 2001.

The entire contents of the above cited applications are hereby incorporated herein by reference.

SOURCE CODE APPENDIX

A compact disc (CD) appendix including source code and other program elements is included herewith. The entire contents of the CD are hereby incorporated herein by reference. The names of the files contained on the compact disc, their date of creation and their sizes in bytes are listed in Appendix A.

FIELD OF THE INVENTION

The invention relates generally to managing patent and trademark applications, and more specifically to a system for management of patent and trademark applications.

COPYRIGHT NOTICE

This patent document contains copyrightable computer software elements including but not limited to source code, flow charts and screen displays. The following notice shall apply to these elements: Copyright© 2004 FoundationIP, LLC.

LIMITED WAIVER OF COPYRIGHT

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

Patent agents and attorneys that specialize in patent or trademark prosecution typically draft dozens of patent or trademark applications per year, and are engaged in prosecution of many more. Each of these must be carefully tracked by the attorney or legal assistant, so that important status information such as potential bar dates, deadlines for response to office action amendments and responses, and other data are not overlooked. In some systems it is possible to store documents related to a particular matter or various matters. Lawyers wishing to use these documents or store them locally are often required to copy the documents from a server hosting the documents to another storage device, such as a disk drive on a client computer connected to the server.

SUMMARY OF THE INVENTION

According to one example embodiment of the inventive subject matter, there is provided method and apparatus for storing and processing information in a data storage and processing system on a server wherein the server is accessed by users obtaining access to electronic documents. Users may select a group of electronic documents stored in the management system, wherein the electronic documents are associated with a particular one of the legal matters. Users may request that the group of documents be bulk downloaded, and the documents are automatically downloaded to a target storage device, for example on a client computer.

According to one embodiment, the group of documents is selected using a web-based interface. According to another example embodiment, users download to the client a computer program that operates on the client computer and communicates with the processing system to download the group of electronic documents.

BRIEF DESCRIPTION OF THE FIGURES

FIG. 1 shows a web page from an Internet-based patent and trademark management system, consistent with an embodiment of the present invention.

FIG. 2 shows a messages web page, consistent with an embodiment of the present invention.

FIG. 3 shows a new tasks web page, consistent with an embodiment of the present invention.

FIG. 4 shows a new matters web page, consistent with an embodiment of the present invention.

FIG. 5 shows an organization view web page, consistent with an embodiment of the present invention.

FIG. 6 shows a templates web page, consistent with an embodiment of the present invention.

FIG. 7 shows an activities web page, consistent with an embodiment of the present invention.

FIG. 8 shows a user management web page, consistent with an embodiment of the present invention.

FIG. 9 shows a message list web page, consistent with an embodiment of the present invention.

FIG. 10 shows an activities web page, consistent with an embodiment of the present invention.

FIG. 11 shows an entities view web page for a selected matter, consistent with an embodiment of the present invention.

FIG. 12 shows an associated parties web page for a selected matter, consistent with an embodiment of the present invention.

FIG. 13 shows an IDS documents web page of data associated with a selected matter, consistent with an embodiment of the present invention.

DETAILED DESCRIPTION

Figure 14:
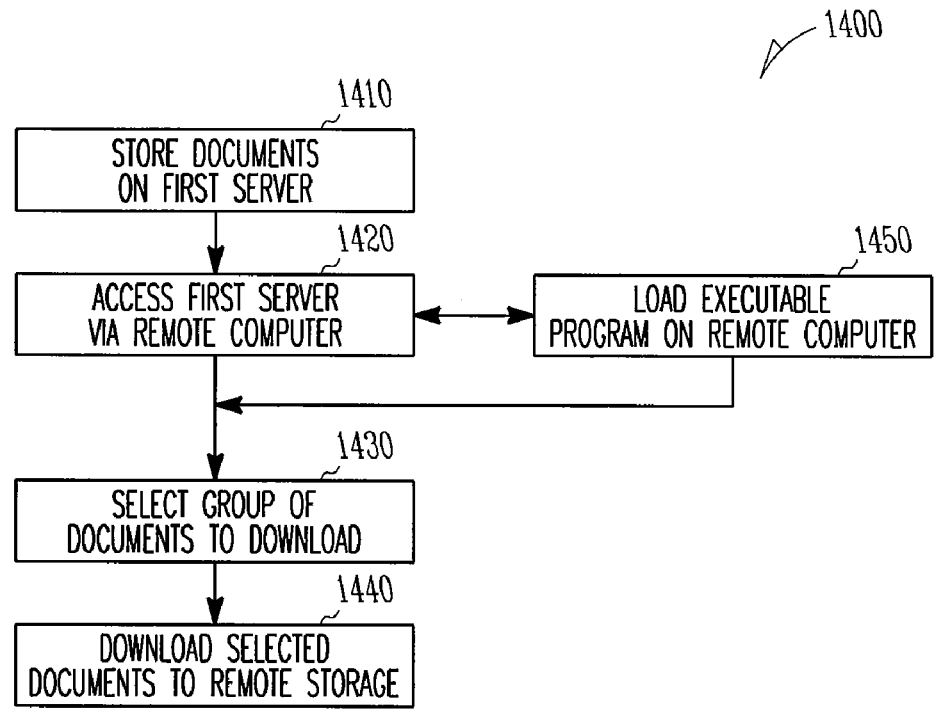
FIG. 14 is a flow chart illustrating features consistent with an embodiment of the present invention.

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

In one embodiment of the invention, a web-based service provides a legal entity or a client or other affiliate of a legal entity access to data management functions to facilitate legal proceedings. A law firm may utilize the web-based system to track data for a client, such as patent and trademark status, docketing, documentation, and billing.

A client may be provided access to the web-based system, and when the client accesses the system is offered account setup functions which when selected enable the client to utilize the system to perform various functions separate from and optionally visible to the law firm. For example, an invention disclosure management module may be a part of the web-based service that is utilized by the client, but invention disclosures entered into and managed by the system will not be visible to the law firm until they are released to the law firm's attention. The client may therefore use the web-based system to store invention disclosures and use them for evaluation, budgeting, awarding of inventor stipends, or for other functions that are not initially or may never be visible to the law firm, as well as to record disclosure information that is selectively or entirely released to the attention of the law firm or to any other law firm.

Invention disclosure management in further embodiments includes a function for receiving invention disclosures and for time-stamping receipt of received disclosures for date of invention record verification purposes. Also, the invention disclosure module may comprise a facility so that reviewers of an invention disclosure may electronically witness and sign an invention disclosure, such that the signature of the signing witnesses is further date-stamped with data indicating the date of electronic signing.

The invention tracking module in some embodiments is further operable to track potential bar dates relating to national and international filing, based on data entered relating to an offer for sale, public use, publication, or other activities relating to the invention. The module provides notice at various dates to the client of nearing potential bar dates, alerting the client to the potential bar date and the action that must be taken to ensure rights are not lost.

The functions available to the client also include in some embodiments calendar or date tracking functions relating to various activities performed in the course of IP management, such as invention disclosure meetings, attorney meetings, technical review board meetings, etc., and if applicable further track decisions or results of these meetings such as whether to pursue a patent application relating to a specific invention disclosure.

One module of the web-based system usable for client data management, in one embodiment, comprises a data registry of various intellectual property held, such as records relating to trade secret identification and retention, a record of various trademarks and their uses and relevant registration or other legal information, and a patent portfolio log indicating issued patents and their various characteristics such as keyword and subject classification data such that a client may readily view and understand a record of his intellectual property holdings. In a further embodiment of the invention, the web-based system comprises a module operable to search the data relating to these various intellectual property assets, and to produce an intellectual property report or audit.

The client system will in some embodiments include a document system enabling creation or merging of various documents relating to intellectual property matters. License agreements, assignments, non-disclosure agreements, and other such legal documents are examples of documents that may be useful to clients and are included in the various embodiments of the invention.

The client's account data can be readily exchanged with the law firm via the web-management system in some embodiments, such that invention disclosure and potential bar date information relating to a case can be made available to the law firm once the decision to pursue a patent for a particular invention disclosure is made. In further embodiments, the web-based system provides issued patent or other reference search capability in various embodiments to the law firm and to the client for performing and documenting an electronic patentability search and review, so that results of a patentability search relating to an invention disclosure can be stored, and relevant documents recorded for preparation of an Information Disclosure Statement.

Further, in one embodiment, the law firm and the client are capable of exchanging other data via the web-based system, such as submission of a trademark, copyright, or trade secret matter for various purposes, as well as capability to track and coordinate data relating to other matters such as opinion-related issues and work. In one embodiment of the invention, these various intellectual property matters are identified to the client and to the law firm by a matter or activity identifier which need not be the same for both client and law firm, but which identify the same matter and enable identification and specification of data relating to the various matters in which the law firm and client are involved. In addition to matter identifier-based viewing of data, the web-based module in various embodiments comprises activity-based views in which an entity may view the various activities requiring attention for his various matters, may view all matters which have a certain activity pending, or may view another activity-based view of the intellectual property matters under management.

In some embodiments of the invention, the web-based systems used by the client and the law firm are the same computerized system, while in other embodiments they are separate computerized systems but are operable to exchange data as appropriate for proper operation of the invention as described in the above various examples. In some embodiments where the same system is used, various forms of encryption are used to ensure the confidentiality of data as it travels over the Internet or other network. In embodiments where a separate computerized system is utilized by the client, the client may install and configure his own computerized system to host a local web-based system consistent with the present invention such that the client's confidential information such as trade secret information and invention disclosures not released to external entities are held within systems under the client's control. Such systems will be able to exchange data with other computerized data management systems under the client's direction, and so provide the various functions discussed in the example embodiments of the invention presented herein.

Embodiments of the present invention can provide systems and methods for management of intellectual property information, legal information, and/or patent and trademark applications. Various embodiments are described herein with reference to the Figures.

The invention comprises in one embodiment a system for managing patent application data via the Internet, and comprises matter, task, and security modules. The matter module is operable to manage data such as docketing data relating to patent matters, the tasks module is operable to manage tasks related to each matter managed by the matter module, and the security module is operable to restrict access to task and matter data management to selected system users. The system is implemented in some embodiments as a World Wide Web site on the Internet, which in further embodiments comprises various components such as an application server, a Java server, and a database.

FIG. 1 illustrates one embodiment of a front World Wide Web (WWW) web page of a system consistent with the present invention. A user will log in to the example system shown here by entering a user name at 101, and a password at 102. If a prospective user does not have an account but wishes to create one, the user may do so by selecting to register at 103.

Upon logging in, the user is presented with a home screen presenting the user with various options. For example, the user may be presented with or may select to view his new messages, as is shown generally in FIG. 2. Each message as shown in FIG. 2 includes a message type represented by an icon at 201, an indication of the number of attachments to the message at 202, a matter title indicating a matter related to the message at 203, an indication of who the message is from at 204, a message title at 205, and the time and date the message was received at 206. The user may select a message to view the message, may select a user to send a reply message to the user, may select the message title to display the message, may select the number of attachments indicator to view the attachments, or may take other actions in response to the new messages screen shown in FIG. 2.

The user may also be presented with or select to view a new tasks screen as shown in FIG. 3, which illustrates new tasks associated with the particular logged in user. Each task has associated data that is displayed in the new tasks view, including the task name at 301, the type of task at 302, the title of the matter the task is related to at 303, the status of the task at 304, and a date associated with the task if appropriate at 305. Tasks may be flagged as shown at 306, so that a user may elect to view only flagged tasks or only new and flagged tasks, thereby viewing a subset of tasks that are of higher importance to the user.

In some embodiments of the invention, the user will be able to generate similar task lists, where the lists are limited to or sorted by client, by date due, by date completed, by status, by type, or by other similar criteria.

Users may also elect from the home page of the example embodiment of the invention described here to view new matters, as shown in FIG. 4. The title of each new matter is shown at 401, and the type of matter is shown at 402. The matter status is shown at 403, and additional matter material may be shown in further embodiments of the invention. As with tasks, users may also view in further embodiments of the invention other matter summary views similar to the one shown in FIG. 4, such as a view of all matters relating to a particular client, all matters with tasks due during a certain time period, all matters with a certain matter status, or any other such customized matter view.

Matters and users may be associated in some embodiments of the invention with organizations, such as with particular client companies or particular law firms. These organizations are managed by the example embodiment of the system discussed here as is shown in FIG. 5. Each organization is identified by name as shown at 501, and has a type associated with it to identify the nature and role of the organization. The contact or agent for each organization is shown at 503, along with a contact phone number 504 and e-mail address 505 for each contact. Organization data may in some embodiments of the invention be edited or added only by system administrators, and in further embodiments select members who are part of an organization will be given authority to edit existing organization data.

Tasks may be created for matters by manually entering tasks, or in some embodiments of the invention may further be created automatically via templates or other predefined task generation utilities. FIG. 6 illustrates a view of templates available for application to matters in one embodiment of the invention. The template name is shown at 601, and the organization associated with the template is shown at 602. The last modification of the template is reflected at 603 and 604, where the modifying user's identity and the date and time of the last modification are shown. The user has the option to delete existing templates as shown at 606, to create new templates, or to edit existing templates as shown at 605.

Templates include such items as creating checklists to ensure proper drafting criteria are met, creating tasks with associated dates such as deadlines for responses, and other similar tasks that are common to many applications and have predictable elements. For example, a client may request that a certain checklist of drafting criteria be completed before each filing, and the checklist may be implemented as a task associated with each of the client's matters via use of a template. Also, creation of docket dates and tasks associated with those dates in a system such as the present invention may be automatically calculated and created by a template, ensuring proper application of applicable rules. Many other such examples of tasks common to many applications with predictable elements exist, and all are within the scope of the template function as implemented in the example of the present invention presented here.

FIG. 7 illustrates the activities that are associated with an amendment and response to a typical United States Patent and Trademark Office issued Office Action. The typical shortened statutory three-month date for response is shown as an activity item at 701, and is followed by subsequent deadlines for taking each allowable extension of time past that date. These items will then automatically be added to the task list of each matter to which the template is applied, creating appropriate task entries for that matter.

FIG. 8 illustrates a user management view of all users that have registered with the embodiment of the present invention described here. The user name or alias is shown at 801, the entity type is shown at 802, the full name of the entity is shown at 803, and contact information including phone and e-mail are shown at 804 and 805. The user management screen shown here allows a system administrator to delete users at 806, and indicates the source of the user at 807.

An example message list is shown in FIG. 9, which illustrates a variety of messages for a particular user. The subject or name of the message is shown at 901, and the title of the matter to which the message pertains is shown at 902. The sender of the message is shown at 903, and the date the message was received is shown at 904. At 905, the user is shown a Delete object that may be selected to delete the associated message. The type of message is indicated at 906, and the number of attachments to the message are shown at 907. Note that in this example, several automatically generated messages such as reports of actions completed or docket dates are shown in the message box.

FIG. 10 shows a view of tasks or activities associated with a particular matter. The activity is shown at 1001, and is selectable by the user. Selecting the activity by name will open the detail list for that particular activity. Any restrictions on access to the activity are shown at 1002, and the status of the activity is shown at 1003. Relevant dates for the activity, which may vary in type depending on the activity status, are shown at 1004. At 1005, the user may edit or delete listed activities. Because the matter shown here is an issued patent, the patent number, issue date, and other information are known and are displayed at 1006 in a matter page header.

FIG. 11 shows an entities view of a particular selected matter. The parties in interest in this example comprise Intel Corp., as shown at 1101. The law firm associated with the matter is shown at 1102.

The embodiment of the invention shown here also shows additional associated parties, such as corporate counsel responsible for overseeing the matter, the attorney and paralegals involved with the case, and other users or entities involved with the matter. This is shown in FIG. 12, where the associated users are listed at 1201. The role each user has in the matter is shown at 1202, and the status of the user is shown at 1203. Note that a user may be invited to join a matter, but is not listed as active in this embodiment of the invention until the user takes affirmative steps to join in a matter.

FIG. 13 is an IDS documents view of data associated with a matter, and shows documents that must be disclosed in an Information Disclosure Statement or IDS to the USPTO. Because no documents have been associated with this example matter, none are illustrated here. For patent documents that must be cited, the patent number, issue date, country of issue, name, and translation are shown at 1301. For documents that are not patent documents but are other publications, the author's name, document title, citation, referred pages, and publication date are recorded and are shown at 1302.

The example embodiment of the present invention explained above and in the figures is further described in the following use case, which describes ways in which the functionality of the present invention may be used by various users and organizations to facilitate more efficient management of a patent or trademark docket.

The use case system will be used in a decentralized way as a web-based application where multiple law-firms and corporations, as well independent lawyers and consultants, can all come together to collaborate on patents in which they are involved.

The service provider will deal with various law-firms and corporations to create a community where patents filing process can be vastly streamlined. All such law firms and corporations (referred to as 'Business entities') will, be dealing directly with the service provider (sending all the materials to be scanned, etc. to them). There will be an administrator at the service provider, who will be to verify business entities details and assign them a account number (provided by our system).

The business entities will assign an account administrator who will be responsible for managing who participates on behalf of the entity in the patent process. The business entity does this by sending an invitation to a prospective participant with an access code that allows him to access information relating to the business entity. In this process, the administrator may also authorize such participant to charge matter and other related costs to specified account number.

Membership in groups is regulated such that anyone can create a user account and associated login. This person can then create a new matter to be managed via the service provider's web site, and can specify other participants for that matter. The service provider then sends e-mail to these invited participants with an invitation to join and a password or secure link. An invitee can then log in, and select to access the matter from his matters list, and supply a password received in the e-mail to associate the new matter with his particular user account and matters list. One example involves an attorney who logs on, opens a new matter, then sends invitations to inventor, paralegals, etc. For each one of these, he provides an email address to which an invitation is sent, and a password with which the invited users can access the matter. Inventor gets email with a site URL, matter number and password. When he clicks it, he is required to sign in. When he gets to my matters, he presses 'Access New Matter' button, which asks him for matter number and password. He fills in this information from what he received by email. This matter is now made available on his matter list.

In a second example scenario, Thomas Edison signs up with the service, and creates a new matter. He fills in notes regarding the invention and other information, and finally decides on an attorney or law firm to work with. He sends invitations to selected attorneys there. The attorney accepts the invitation, and then sends out additional invitations to paralegals and other associated users.

In a third scenario, Idle Joe signs up, and goes to 'My matters'. He sees nothing there. He cannot access any existing matters to which he has not been invited. He opens a new matter, and plays around with the functions provided by the website. He realizes there's nothing at the service provider for him, then logs off and goes on to cause trouble elsewhere. New users who do not have any associated matters and are not members of any group will periodically have their accounts deactivated to ensure smooth operation of the service provider system.

This use case example further provides billing functionality. The service provider provides the option of billing for each open matter, and allows creating billing entries for services associated with a matter, such as docketing, prior art searches, drafting, drawing preparation, or other related services or products.

The service provider's system is configured such that the entities that interact with the system are categorized into individuals, businesses, clients, law firms, the USPTO, and the service provider, as explained in greater detail below.

Individuals includes ordinary individual users who could be attorneys working for a law-firm, independent attorneys, employees of corporations, independent consultants, paralegals, etc. In short, it includes any person who is involved or expected to be involved in the managing of a matter through to completion.

Business entities allows several individuals to participate in the process under the same umbrella. Two types of Businesses are recognized: Client, and Law Firm businesses. A Client participates as a requester of patent services and law firm acts as provider of such services.

Clients are the entities that are seeking patent services. The client can be a corporation, university, or other entity, and essentially defines a grouping of individuals who can share information that is common to them by virtue of their association with the client entity. For example, a corporation will have a preferred set of law firms, a preferred set of foreign associates, and other preferences and relationships. An account administrator for the corporation can assign privileges to different people for different pieces of information associated with the Corporation.

A law firm is a grouping of individuals, including lawyers, paralegals, and other individuals who can share information common to them by virtue of their association with a legal services provider. For example, lists of client companies and information about individuals within them is information may be accessible to various degrees throughout a law firm. A law firm administrator can invite people to be members of the law firm group and give privileges to them for access to various information.

Still other entities may be created and invited to participate in a matter to facilitate patent legal services. The United States Patent and Trademark Office and select examiners may be given certain access to relevant matters, outside service providers such as scanning service providers may be given access to certain data, and the service provider operating the website may have varying degrees of access to data.

The service provider will desirably manage the various accounts and grouping of entities, and provide customer support for the various services and functions of the website. The service provider will not only have access to certain data, but will be able to determine billing for services provided via the website, account information of the member entities, and will have account management capability.

The various matters managed via the service provider include a client name, a client contact name, a law firm or service provider name, a law firm matter number, a client reference number, a unique reference number provided by the service provider, a foreign associate for various corresponding foreign filings, and identification of the various law firm members assigned to the matter. Law firm roles include billing attorney, working attorney, signature attorney, paralegal, docketing specialist, IDS specialist, and various secretaries that may be associated with the other law firm members.

Individuals can have one or more roles in a client organization, and may belong to several organizations or groups via a single user name or login ID. It is anticipated that a typical individual will serve various roles in a number of different matters, and will have access via a single login or user ID to information related to each of the various matters with which he is associated.

Business entities may further have approved lists of law firms, foreign associates, and other approved entities. Individual attorneys may also be approved, and lists of individuals working with the business entity matters within other entities may be used.

For this use case example, assume an administrator representing a business or corporate entity desires to use the service provider to manage patent-related legal services. The administrator creates a new account within which matters created by its approved members can be created, managed, and billed. The business account manager can add new law firms, attorneys, foreign associates, business representatives, inventors, and other members. The business account administrator can further deactivate or remove various members from the business account or matters owned by the business account, and can generate reports and retrieve information relating to the various matters and entity involvement in the matters owned by the business account.

A law firm entity will have the ability to create new client records, including invitation to business entities to join matters or create accounts. The law firm will also have the ability to enter billing and fee data, including calculation of fees for particular services or hourly rates, and entry of fee codes and billing descriptions. The law firm further can invite new users to be members of the law firm, assign users to roles within specific matters, and manage the role of various users within the law firm and within matters with which the law firm is associated.

Individuals will be able to join existing business groups, law firms, or other entities with the approval of the entity. Association with an entity may be at the individual's request, or by invitation from the entity. Each individual, whether a member of another entity or not, will be able to create matters, invite others to participate in the matters, receive and send e-mail regarding the matters, and view the status of his matters. The individual can create or update notes associated with his matters, check outstanding actions or dates for his matters, generate matter reports, print documents, and browse other information relating to his matters. This information includes viewing invited and associated entities for each matter, viewing matter task information, viewing billing or invoice information, viewing related case information, and viewing docketing information.

The individual will also be able to copy, delete, remove, archive, or verify matters, and will be able to search for matter information via law firm docket number, client name, serial number, prior docket number, related case number, inventor name, and other information. The matters will have a notes or discussion area for maintaining matter-related notes, and will have data records enabling automated e-mail reminders of actions due and case status.

Trademarks may be managed as matters, and will have information including the actual trademark sought, action data, country-related data, conflict opposition data, auxiliary files or tables, reports, recurring date menus, utility menus, agent details, and country details. Managed patents will similarly have record space configured for storing invention or disclosure data, country application data, actions due or docketing data, auxiliary files and tables, reports, maintenance fee data, utility menus, actions menus, and cost tracking and budgeting data.

Information disclosure statement (IDS) records are associated with various other matters such as filed or unfiled patent applications, and are managed via functions that include the ability to copy documents to or from other matters to which the user has access, to delete or add documents associated with a particular matter, to combine references cited from various matters, to scan or view images of various references, to view US patent documents by patent number, title, or other identifier, to view foreign patent documents, to view non-patent documents, or to view all associated documents. Documents associated with an IDS may be marked as relevant or not relevant, or may be unmarked. The documents associated with an IDS for a particular matter may therefore be viewed, printed, merged, sorted, or otherwise managed based on whether they are marked relevant, marked not relevant, or unmarked.

Marked documents may be merged into forms such as a standard form 1449 for citing relevant known art to the USPTO. Documents that have been cited are marked separately from those that have been marked but not yet sent, to enable accurate tracking and determination of which documents have been cited and which documents are yet to be cited.

Each IDS reference document will have associated records that enable accurate identification of the document, such as US patent number, foreign patent number, issue date, priority date, inventor names or author names, publication name or other citation of non-patent publications, and title. It is desired that the records associated with each IDS reference be sufficient to meet the formal reporting requirements in citing the document to the USPTO via a form 1449 or other appropriate method.

Some members, such as scanning centers, may have very limited capabilities relative to a typical member or entity. A scanning center, for example, may be limited to uploading scanned data to be associated with a particular matter, entering billing or invoice charges and descriptions, and generating reports of uploaded data and billing charges.

Finally, in a use case such as that described here, a business entity or other client can easily change law firms, attorneys, or the role of other members in various matters managed via the service provider with minimal effort or expense.

Bulk Download of Documents

As described above, a data management system for intellectual property management allows for efficient handling of legal matters. A law firm operating a computer database system according to one embodiment of the present invention maintains detailed data and documents pertinent to representation of clients. Access to the data can be provided to the clients through security protocols. It may be desired by the clients to download, or copy, some or all of the data to a second data base. That is, the client would like to populate its management system without recreating the data manually. Embodiments of the present invention allow users to download bulk data from one computer server to another computer while maintaining integrity of the data.

A method 1400 (FIG. 14) and apparatus provide, in one example embodiment, for storing and processing information in a data storage and processing system on a server 1410. The server is accessed by attorneys, wherein the information pertains to a plurality of legal matters being handled by the attorneys, and wherein the legal matters are for respective clients. A secure access is provided to the server via a remote computer 1420. A group of electronic documents stored in the management system are selected 1430 using a client computer, wherein the electronic documents are associated with a particular one of the legal matters, and a user requests that the group of documents be bulk downloaded. The group of documents is downloaded 1440 to a storage device on the client computer or other storage or computing device.

In one embodiment, a computer program is first loaded and executed on the remote client computer 1450 that operates on the client computer and communicates with the data processing system to download the group of electronic documents.

Figure 15:
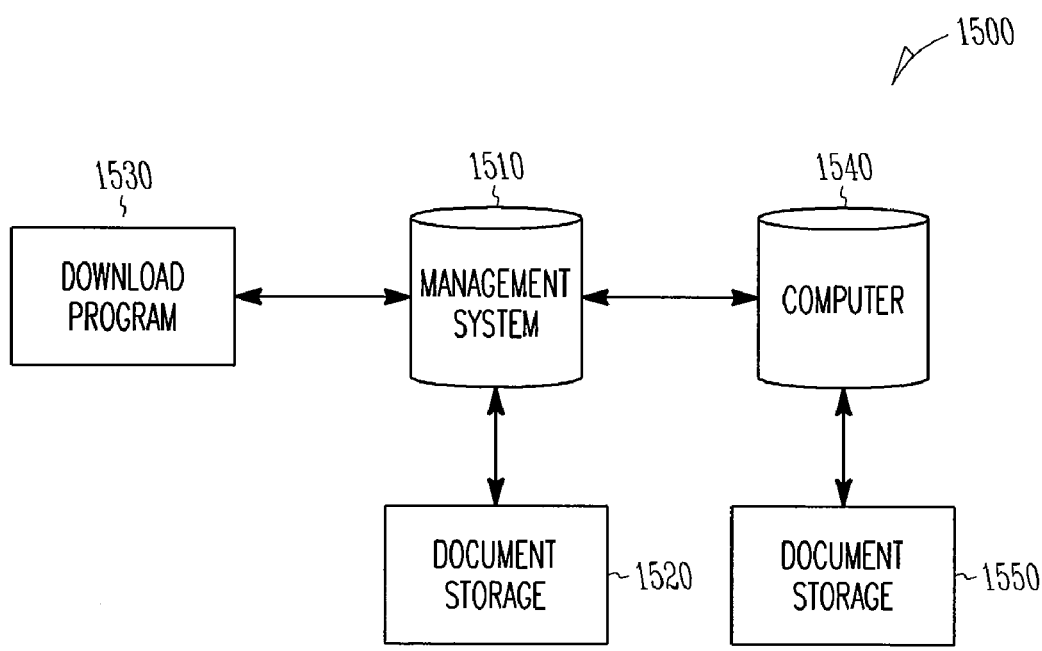
FIG. 15 is a diagram illustrating features consistent with an embodiment of the present invention.

FIG. 15 illustrates a system 1500 which includes a management system 1510 operating on a computer/server for managing document storage 1520, as explained above. The management system can also manage a download program 1530. A remote computer 1540 can communicate with the management system, for example via a web-based interface. Computer 1540 can request bulk downloads of documents 1520 to document storage 1550. In addition, download program 1530 can be loaded on computer 1540 and executed thereby to coordinate storage of bulk downloaded documents.

A method of managing a portfolio of intellectual property files can be implemented in one embodiment where a client authorizes the transfer of a file from one law firm to another. In this embodiment secure data is maintained in a management system by a first law firm. Access to the data is limited to authorized participants, such as the law firm's staff and the law firm client. If the client decides that the file is to be transferred to a second law firm, or entity, authorization can be provided to the second law firm to access that file remotely. That is, the first law firm provides a security clearance for the second firm to access the identified file(s). The second law firm can then access the data management system and bulk download selected documents. This embodiment provides an efficient method for transferring documents between multiple parties. Again, a computer program may be first loaded and executed on the remote second law firm's computer to communicate with the data processing system to download the group of electronic documents.

The invention claimed is:

1. A method comprising:

storing and processing information in a first database on a data storage and processing system on a server, the server is accessed by a user from a client computer, wherein the information pertains to a plurality of legal matters being handled by attorneys, and wherein the legal matters are for respective clients;

from a client computer, selecting a group of electronic docketing records and associated documents stored in the first database on the data storage and processing system, wherein the electronic docketing records and associated documents are associated with a particular one of the legal matters; requesting that the group of electronic docketing records and associated documents be bulk downloaded; and automatically downloading the group of electronic docketing records and associated documents to a second database on a storage device on the client computer, wherein downloading the group of electronic docketing records and associated documents includes downloading the group of electronic docketing records and associated documents via a single download request, the automatic download of the group of documents maintains data integrity by copying the file structure and linkages for the docketing records and associated documents in the first database to the second database.

2. A method according to claim 1 further wherein the group of electronic docketing records and associated documents is selected using a web-based interface.

3. A method according to claim 1 further including downloading to the client a computer program that operates on the client computer and communicates with the processing system to download the group of electronic docketing records and associated documents.

4. The method of claim 1, wherein the data electronic docketing records for which integrity is maintained comprises at least one of docket dates, tasks associated with the docket dates, a client name, a client contact name, a law firm, a service provider name, a law firm matter number, a client reference number, a unique reference number, provided by a service provider, foreign associates, identification of law firm members assigned to a matter, patent numbers, issue dates, publication dates, serial numbers, and filing dates.

5. The apparatus of claim 1, wherein the maintaining the data integrity of the electronic docketing records further comprises:

during the automatically downloading of the electronic docketing records copying from the first secure database to the second secure database one of a docketing rule and a docketing task associated with the docketing record.

6. Apparatus comprising a programmed computer adapted to:

store and process information in a first database on a data storage and processing system on a server, wherein the information pertains to a plurality of legal matters being handled by attorneys, and wherein the legal matters are for respective clients;

from a client computer, select a group of electronic docketing records and associated documents stored in the first database on the data storage and processing system, wherein the electronic docketing records and associated documents are associated with a particular one of the legal matters; and request that the group of electronic docketing records and associated documents be bulk downloaded; and automatically download the group of electronic docketing records and associated documents to a second database on a storage device on the client computer, wherein an automatic download of the group of electronic docketing records and associated documents includes downloading the group of electronic docketing records and associated documents via a single download request, the automatic download of the group of documents maintains data integrity by copying the file structure and linkages for the docketing records and associated documents in the first database to the second database.

7. Apparatus according to claim 6 further wherein the group of electronic docketing records and associated documents is selected through a web-based interface.

8. An Apparatus according to claim 6 further wherein the programmed computer is adapted to download to the client a client computer program, wherein the client computer program is operable on the client computer to communicate with the processing system to download the group of electronic docketing records and associated documents.

9. The apparatus of claim 6, wherein the data for which integrity is maintained comprises at least one of docket dates, tasks associated with the docket dates, a client name, a client contact name, a law firm, a service provider name, a law firm matter number, a client reference number, a unique reference number, provided by a service provider, foreign associates, identification of law firm members assigned to a matter, patent numbers, issue dates, publication dates, serial numbers, and filing dates.

10. The apparatus of claim 6, wherein the maintaining integrity of the electronic docketing records further comprises:

during the automatically downloading of the electronic docketing records, copying from the first secure database to the second secure database one of a docketing rule and a docketing task associated with the docketing record.

11. A method of transferring documents from a first law firm to a second law firm representing a client comprising:

maintaining a first secure database of electronic docketing records and documents at the first law firm;

providing security access for a second law firm to a specified client file in the database, wherein providing security access is authorized by the client;

the second law firm remotely accesses the first secure database and selects a group of the electronic docketing records and associated documents stored in the database, wherein the electronic docketing records and associated documents are associated with the specified client file;

requesting that the group of electronic docketing records and associated documents be bulk downloaded to a second secure database on a storage device maintained by the second law firm; and automatically downloading the group of electronic docketing records and associated documents to the second secure database on the storage device, wherein an automatic download of the group of documents includes downloading the group of documents via a single download request, the automatic download of the group of documents maintains data integrity by copying the file structure and linkages for the docketing records and associated documents in the first secure database to the second secure database.

12. The method of claim 11, wherein the electronic docketing records for which integrity is maintained comprises at least one of docket dates, tasks associated with the docket dates, a client name, a client contact name, a law firm, a service provider name, a law firm matter number, a client reference number, a unique reference number, provided by a service provider, foreign associates, identification of law firm members assigned to a matter, patent numbers, issue dates, publication dates, serial numbers, and filing dates.

13. The method of claim 11, further comprising:

during the automatically downloading of the electronic docketing records, copying from the first secure database to the second secure database one of a docketing rule and a docketing task associated with the docketing record.

* * * * *